May 29, 1962  C. G. JOA  3,036,605
WOODWORKING MACHINES HAVING CUTTING TOOLS WHICH MAY
SELECTIVELY BE ADVANCED AND RETRACTED WITH
RESPECT TO WORKPIECES ON A CONVEYOR
Filed Aug. 6, 1957  6 Sheets-Sheet 1
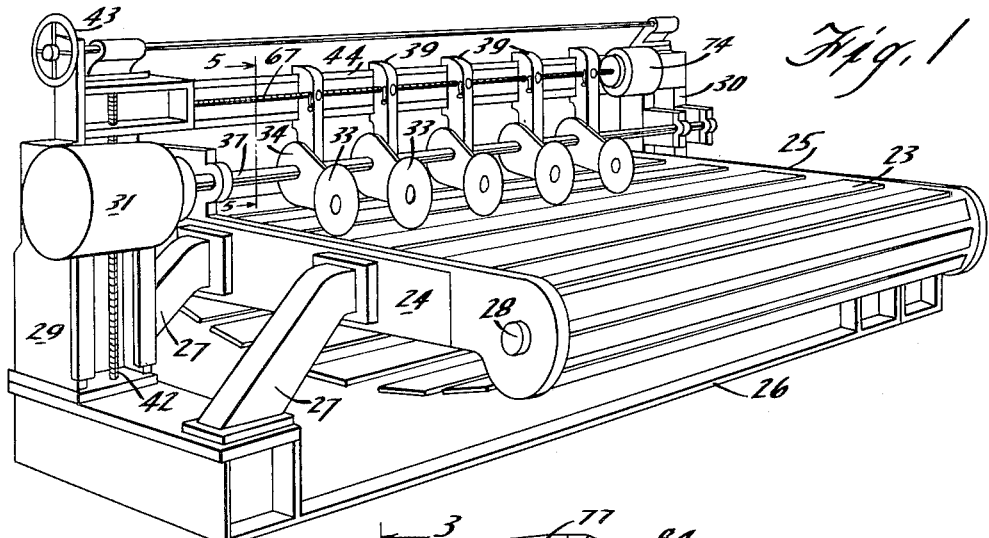
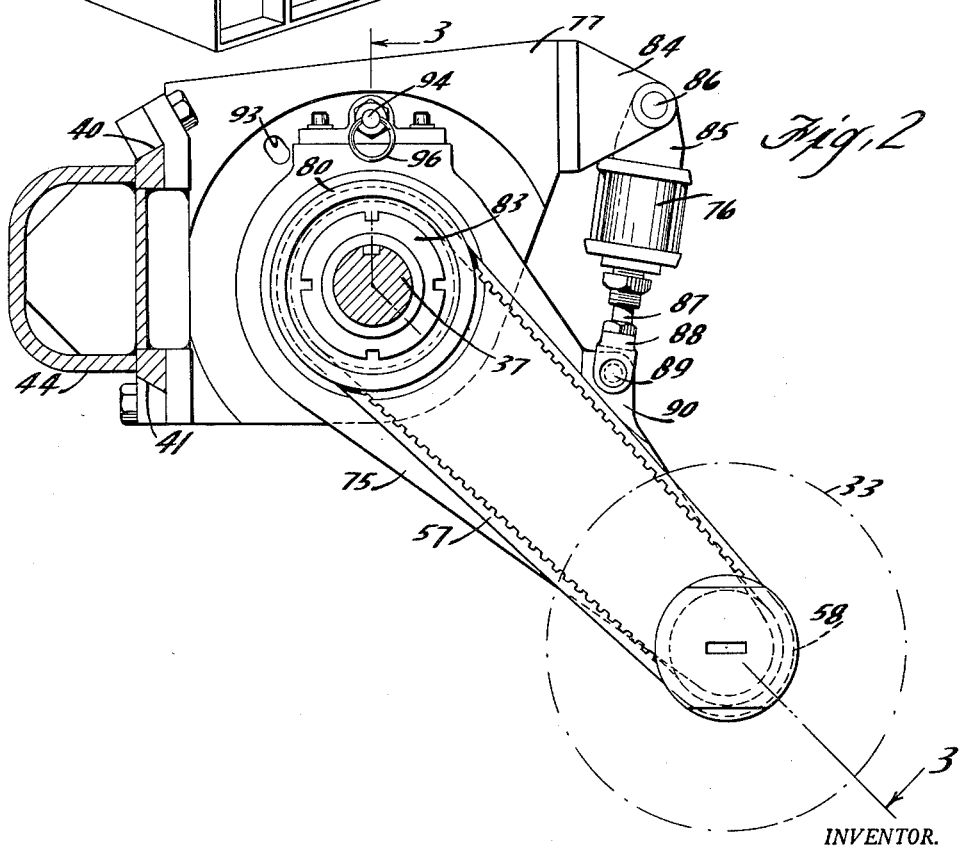
INVENTOR.
CURT G. JOA
BY
ATTORNEYS

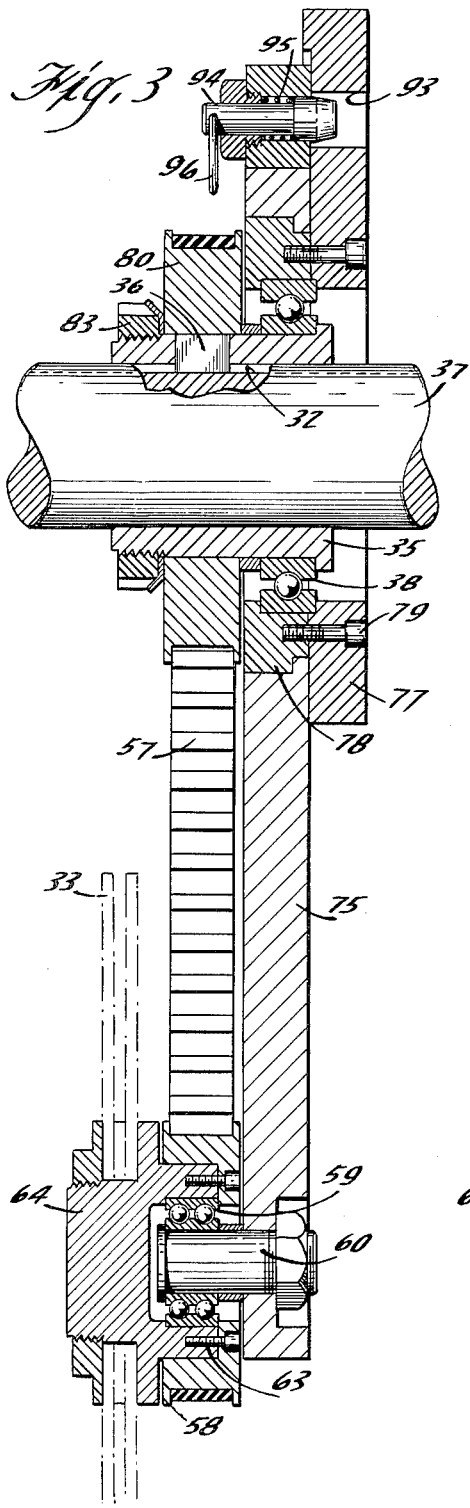
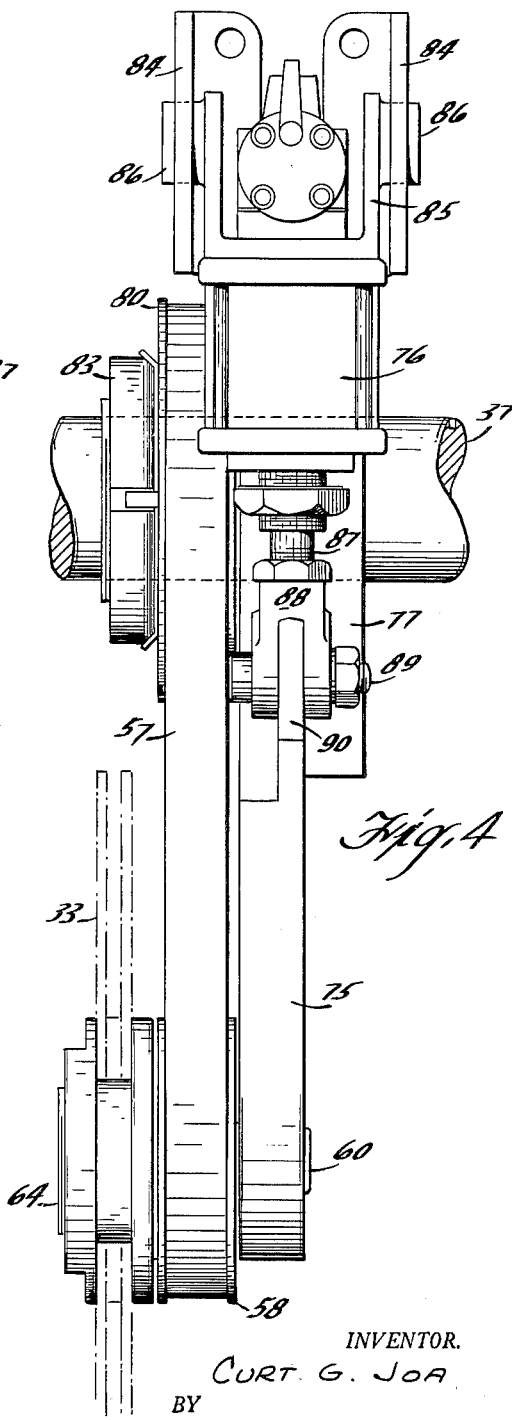

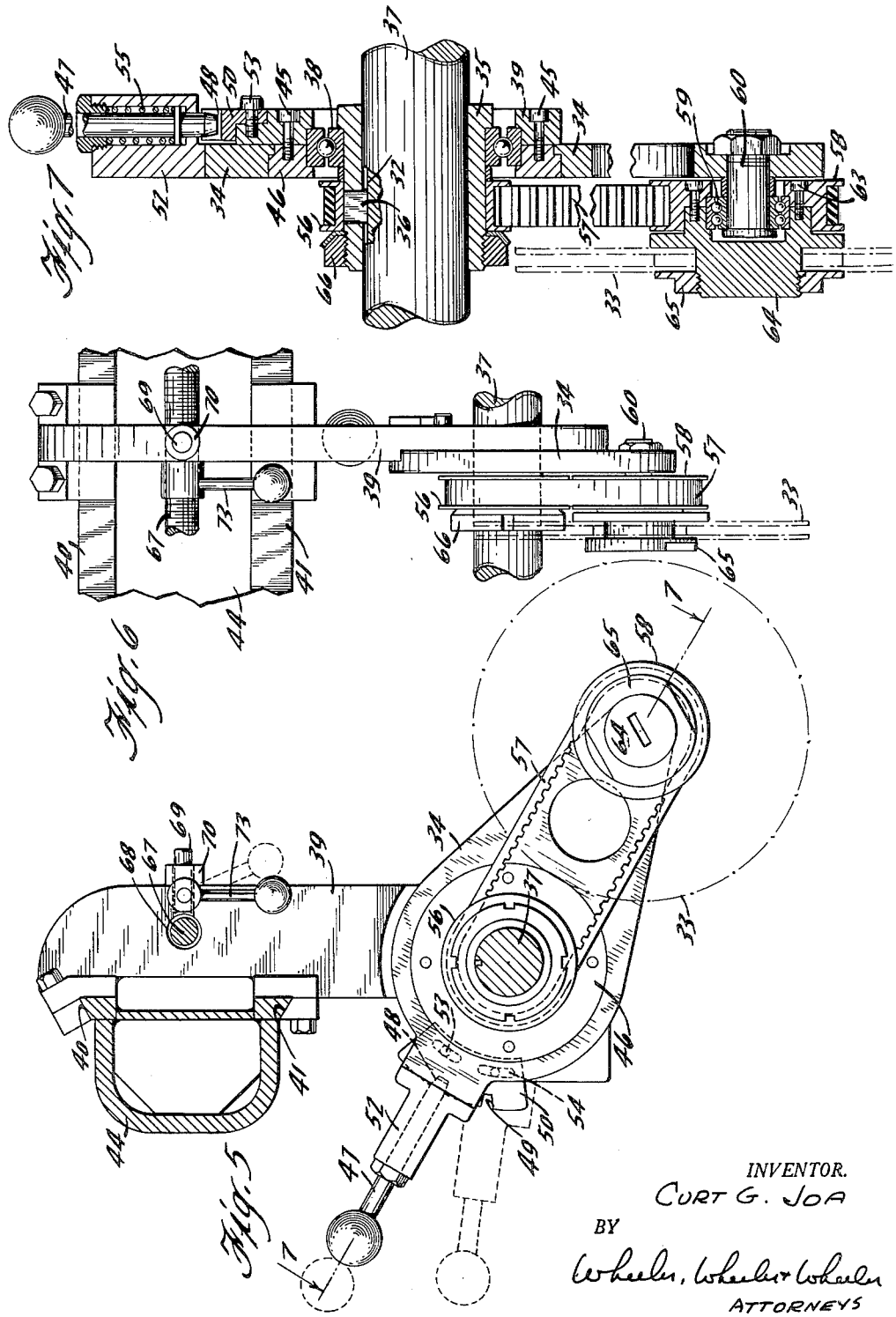

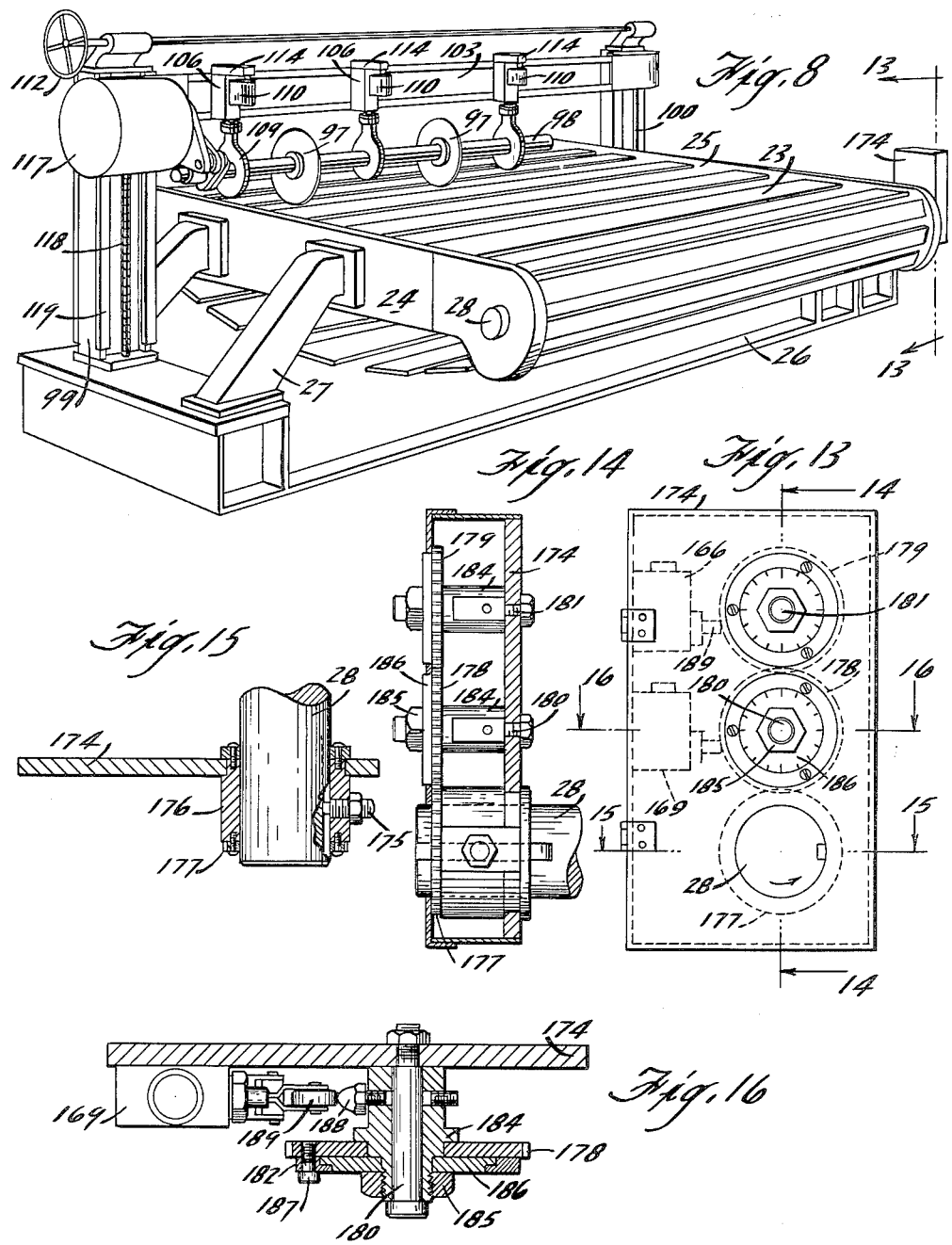

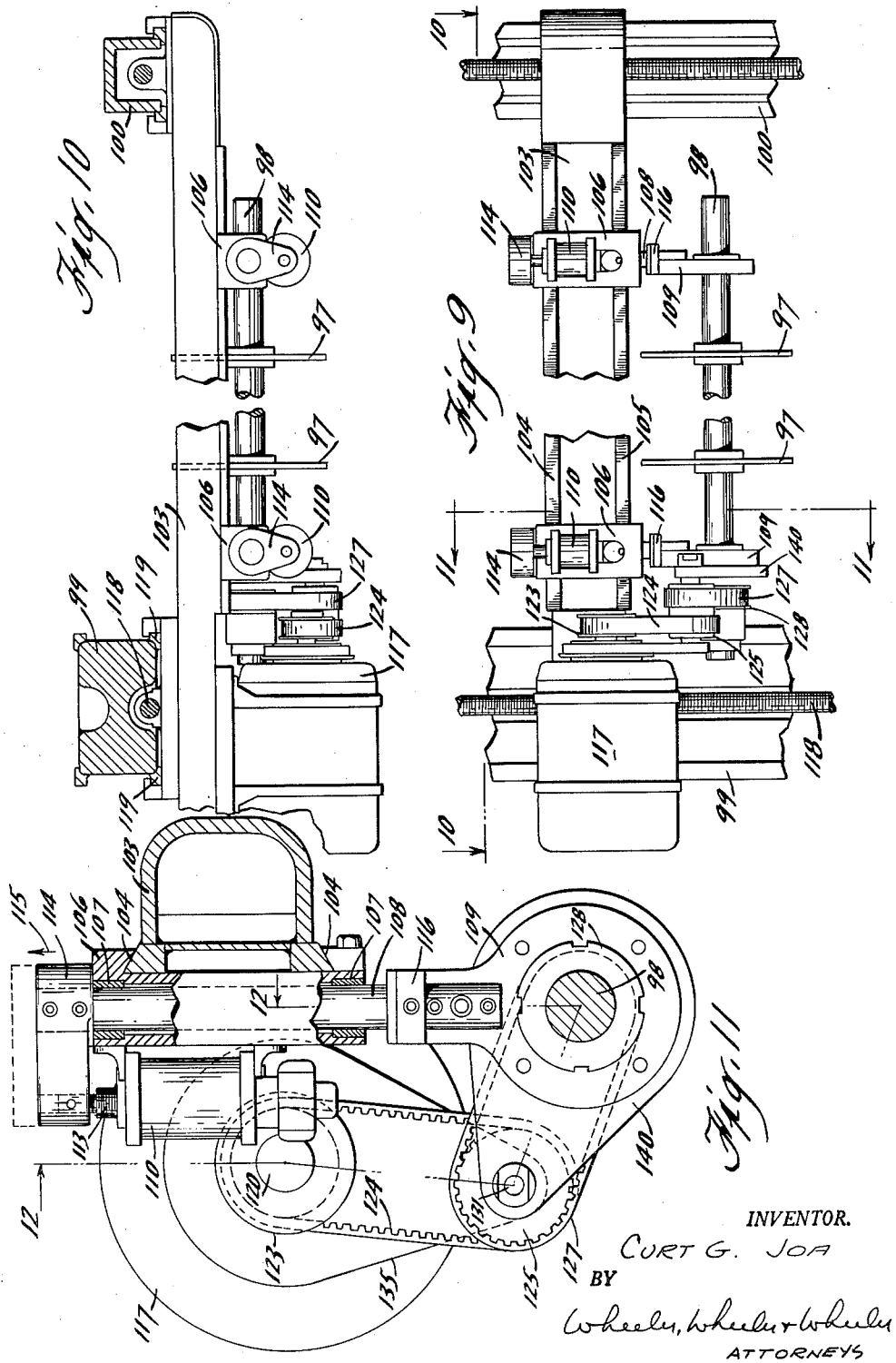

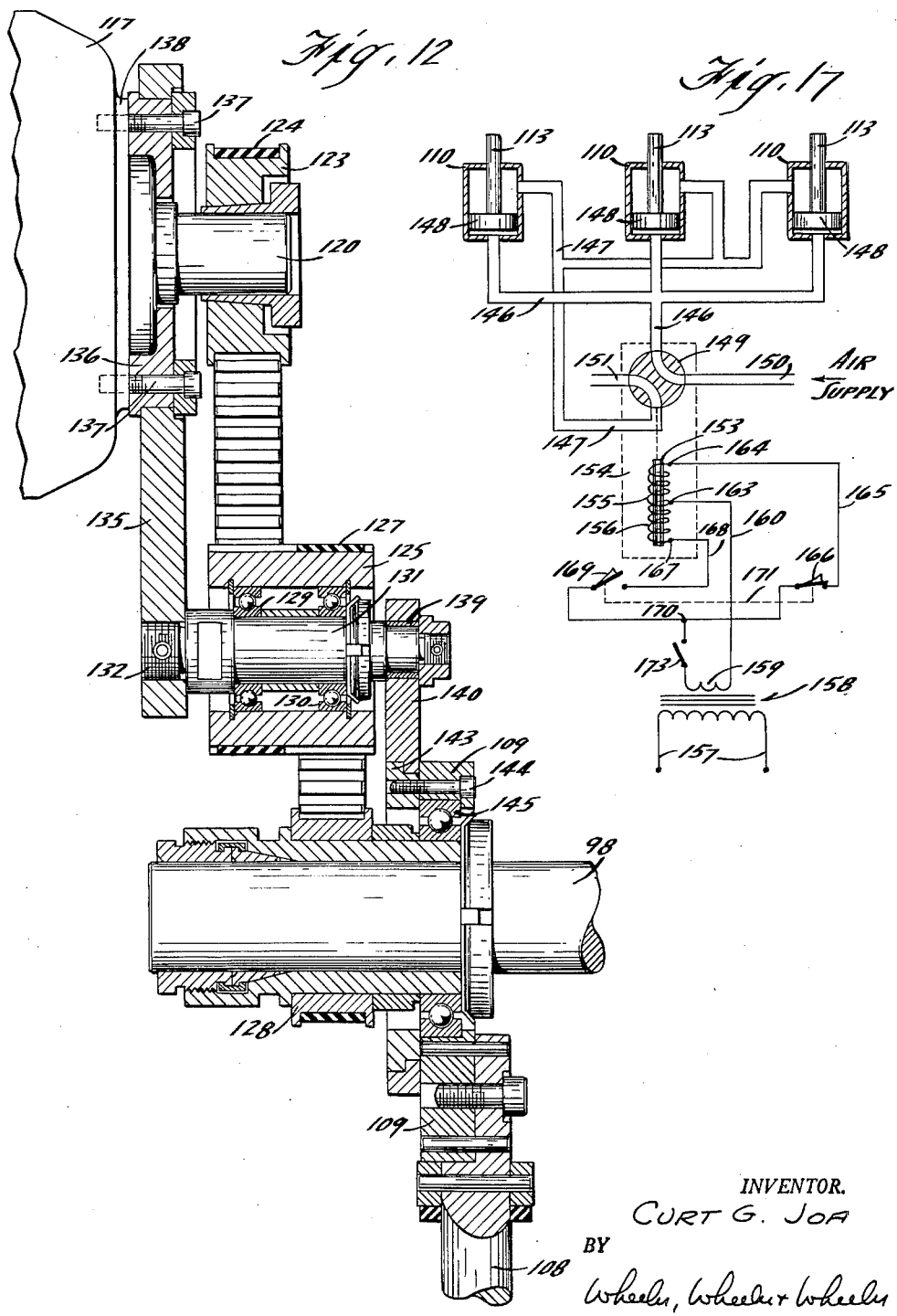

United States Patent Office 3,036,605
Patented May 29, 1962

3,036,605
WOODWORKING MACHINES HAVING CUTTING TOOLS WHICH MAY SELECTIVELY BE ADVANCED AND RETRACTED WITH RESPECT TO WORKPIECES ON A CONVEYOR
Curt G. Joa, Ocean Ridge, Fla., assignor to Kohler-Joa Corporation, Sheboygan Falls, Wis., a corporation of Wisconsin
Filed Aug. 6, 1957, Ser. No. 676,644
5 Claims. (Cl. 143—41)

This invention relates to woodworking machines having cutting tools such as a circular saw, dado cutter, etc. which may selectively be advanced and retracted with respect to workpieces on the conveyor. In some embodiments of the invention the movement of the cutting tools is in timed coordination with the movement of the workpiece on the conveyor.

The device described in this application is frequently known in the trade as a "dado cutter." The device is frequently used to slot or groove boards along their surface and to withdraw the tools before the saw runs out the edge of the board.

In one embodiment of the invention, several cutting tools are mounted on a common arbor shaft, the tools and shaft being moved as a unit to and from coaction with the workpiece. In another embodiment of the invention, each tool is individually mounted for independent movement to and from coaction with the workpiece.

In the embodiment of the invention in which there is a common arbor, the drive motor therefor may be adjustably disposed in relatively fixed position respecting the conveyor and is connected to the arbor by motion transmitting mechanism which accommodates for movement of the arbor with respect to the motor. Accordingly, the relatively heavy motor need not be moved in the course of manipulating the arbor and its tools. In the embodiment of the invention in which each tool is mounted for independent movement, I again prefer to use a common drive shaft or arbor about the axis of which the respective tools are swingable on arms to and from coaction with the workpiece. The respective tools mounted at the ends of the arms have motion transmitting connections with the drive shaft.

Other features, objects and advantages of the invention will appear from the following disclosure in which:

FIGURE 1 is a perspective view of one embodiment of the invention in which each tool is independently supported from a common drive shaft upon an arm swingable coaxially with the drive shaft.

FIGURE 2 is a greatly enlarged cross section taken through a modified swingable arm, arm carriage and fluid motor interconnecting the carriage and the arm.

FIGURE 3 is a cross section taken along the line 3—3 of FIGURE 2.

FIGURE 4 is a side elevation of the device shown in FIGURE 2.

FIGURE 5 is a fragmentary cross section taken along the line 5—5 of FIGURE 1.

FIGURE 6 is a fragmentary side elevation of the device shown in FIGURE 5.

FIGURE 7 is a cross section taken along the line 7—7 of FIGURE 5.

FIGURE 8 is a view similar to FIGURE 1, but showing a modified embodiment of the invention in which the respective tools are mounted on a common drive shaft or arbor.

FIGURE 9 is a fragmentary front elevation of the device shown in FIGURE 8.

FIGURE 10 is a cross section taken along the line 10—10 of FIGURE 9.

FIGURE 11 is a cross section taken along the line 11—11 of FIGURE 9.

FIGURE 12 is a cross section taken along the line 12—12 of FIGURE 11.

FIGURE 13 (sheet 4) is a side elevation of the timing gear box shown in FIGURE 8, the outline of apparatus within the timing gear box being shown in dotted lines.

FIGURE 14 is a cross section taken along the line 14—14 of FIGURE 13.

FIGURE 15 is a fragmentary cross section taken along the line 15—15 of FIGURE 13.

FIGURE 16 is a fragmentary cross section taken along line 16—16 of FIGURE 13.

FIGURE 17 (sheet 6) is a combined simplified diagram of the electrical and fluid circuit for the control of the apparatus shown in FIGURE 8.

The wood working machine shown in FIGURE 1 comprises a slat type workpiece conveyor 23 which is supported on the bed of the machine and extends laterally between the side arms 24, 25 thereof. The arms 24, 25 are supported from a framework 26 by means of pedestal members 27 and the like.

The conveyor 23 passes over the front edge of the bed on sprockets or the like mounted on shaft 28. Workpiece panels of wood, etc. are carried by the conveyor 23 past the columns 29, 30 which support above the path of the workpieces woodworking tools such as the cutting saws 33. Each of the saws 33 in the embodiment of the invention shown in FIGURE 1 is mounted on its own independent support arm 34 which is freely rotatable on a bearing sleeve 35 (FIG. 7) which is secured by key 36 to the spline 32 in the drive shaft or arbor 37. Shaft 37 is driven by motor 31, the vertical position of which is adjustably set by jack screw 42 turned by hand wheel 43. Ball bearing 38 supports the sleeve 35 and the drive shaft 37 from carriage 39 which has a dove tail sliding connection at 40, 41 (FIGS. 2 and 5) with the cross way 44 which spans across the conveyor 23 and is supported at its ends by the columns 29, 30.

Each of the carriages 39 is connected by means of bolts 45 to respective retainer rings 46 on which the respective arms 34 are free to oscillate. In the embodiment of the invention shown in FIGURES 1 and 5 through 7, the position of any arm 34 with respect to the carriage 39 is determined by the selective engagement of a latching pin 47 with one or the other of notches 48, 49 formed in notched segment 50 which is connected to the carriage 39 by adjusting bolts 53. As best shown in FIGURE 5, the bolts 53 are received through arcuate slots 54 in the notched plate 50 so that the respective extreme positions of the tool can be adjusted through a suitable range.

Pin 47 is biased by spring 55 toward engagement with the notched segment 50. Accordingly, the arm 34 will lock in either advanced or retracted position, as indicated by the full and dotted line positions of its rearward extension 52 shown in FIGURE 5.

Sleeve 35 which is keyed to the shaft 37 is provided with a sheave 56 about which a cog belt 57 or the like is trained. Sheave 56 is detachably mounted on sleeve 35 by lock nut 66. The other end of the belt 57 is trained about the sheave 58 which is mounted for rotation on the ball bearing 59 on the stud 60 at the free end of arm 34. The sheave 58 is connected by means of the bolts 63 to the hub 64 of the cutting tool blades 33. Blades 33 are detachably secured to the hub 64 by means of the lock nut 65 and can be replaced by any other cutting blades suitable for woodworking operations.

I may optionally provide the respective carriages 39 of FIGURES 1 and 5 through 7 with a common lead screw 67 which runs parallel to the way 44 and which may be selectively rotatably engaged with the respective carriages 39. As best shown in FIGURE 5, each carriage 39 has a lead screw opening 68 greater in diameter than the threads on the screw 67. Adjacent opening 68 each carriage 39 has a dog 69 mounted for reciprocation in a channel boss 70 and is connected with the crank arm 73 by which the dog 69 can be retracted and advanced with respect to the threaded periphery of the lead screw 67.

The dog 69 has a screw threaded end face which may thus be selectively engaged and disengaged with the threads of the lead screw 67. When any carriage is thus engaged therewith, rotation of the lead screw 67 will impart to such carriage movement along the way 44. However, when the dog 69 is retracted from engagement with the lead screw 67, the lead screw will run free in opening 68 and the carriage 39 will remain stationary notwithstanding rotation of the lead screw.

The lead screw is powered by a motor 74 shown in FIGURE 1. Accordingly, on operation of the motor 74, such carriages 39 as are threadably coupled thereto as aforedescribed will be moved laterally concurrently. Such carriages 39 will carry the arms 34 of their respective tools 33, the keys 36 sliding along the spline 32 in the periphery of the drive shaft 37.

In FIGURES 2, 3, and 4, I show a modified independently swingable arm 75, the position of which is determined by means of the fluid motor 76. The carriage 77 for the arm 75 and shaft 37 has a dove tail connection, 40, 41 with the way 44, as in the previously described embodiment of the invention. However, the details of mounting the arm 75 on the carriage differ in the particulars noted in FIGURE 3. As in the previous embodiment, the shaft 37 is provided with a spline 32 to which the bearing sleeve 35 is keyed at 36. Ball bearing 38 rotatably supports the arm 75 on the carriage 77 and sleeve 35.

A retaining ring 78 fastened to the carriage 77 by bolt 79 guides the oscillatory movement of the arm 75. As in the previous embodiment, the free end of the arm 75 is provided with a stud 60, ball bearing 59, and a sheave 58 connected by the bolts 63 to the hub 64 of the tool 33. The sheave 58 is driven by cog belt 57 trained over sheave 80 fastened to the sleeve 35 by means of the threaded lock nut 83.

The position of the arm 75 relative to a workpiece on conveyor 23 is determined by the fluid motor 76 which has a cylinder connected by yoke arms 85 and pintle 86 to the ears 84 of the carriage 77. The fluid motor 76 has a piston rod 87 connected by means of clevis 88 and pintle 89 to the ear 90 on the arm 75.

I may optionally provide means for locking the arm in either advanced or retracted position, as best shown in FIGURES 2 and 3. The carriage 77 may be provided with spaced notches or holes 93 to receive the pin 94 which is mounted on the arm 75 and has a spring 95 biasing it toward engagement in the notches. The pins 94 may have finger rings 96 by which they can be readily manipulated by the operator.

The fluid circuit and electrical control for fluid motor 76 may be similar to the circuit shown in FIGURE 17 as hereinafter described.

The embodiment of the invention shown in FIGURE 8 is fundamentally the same as that shown in FIGURE 1 except for the mounting of the tools with respect to the workpiece conveyor 23. Each tool 97, circular saws being illustrated in FIGURE 8 for purposes of exemplification, is mounted directly on a common drive shaft or arbor 98. The tools 97 are splined to the arbor 98 and may be readily shifted therealong depending upon the requirements of the work. Side columns 99, 100 support the transversely extending way 103 which has dove tail slide rails 104, 105 (FIG. 11) for the carriages 106 which are shiftable along the way 103. Any number of carriages 106 may be provided depending upon the length of the arbor, three such carriages being illustrated in the drawing. Each carriage 106 is provided with vertically or axially spaced bearing sleeves 107 in which the stem 108 for an arbor bearing 109 is vertically slidable pursuant to actuation of the fluid motor 110. As best shown in FIGURE 11, the motor 110 has a piston rod 113 connected to the cross head 114 which is coupled to the upper end of stem 108 above the top of the carriage 106.

In FIGURE 11 the cross head 114 is shown in its bottom-most position in full lines, the dotted lines therefor indicating its upper-most position when moved in the direction of arrow 115 by motor 110. The limit of the upper-most position of the stem and arbor 98 is determined by the spacing between the stop collar 116 on the stem and the under surface of the carriage 106.

The respective motors 110 for the respective carriers 106 are synchronized in operation to concurrently lift and lower the arbor 98. The control circuit for the fluid motors 110 will be described in connection with FIGURE 17.

The arbor 98 is driven by motor 117 through articulate motion transmitting connections pursuant to which torque is applied to the arbor 98 notwithstanding its movement to and from the workpiece. The motor 117 can be raised and lowered on the jack screw 118 under control of the handwheel 112. Column 99 is provided with vertical slide ways 119 for the purpose. The motor 117 will ordinarily be adjusted by means of the jack screw 118 to a relatively fixed position and the arbor will be shifted relative to the motor 117 pursuant to the action of motors 110.

The motor 117 is provided with an armature shaft 120 with a pulley 123 about which the cog belt 124 is trained. The belt 124 is also trained about pulley 125 which transfers power from belt 124 to belt 127 also trained over sheave 128 on arbor 98.

The details of these parts are best shown in FIGURE 12. The broad pulley 125 is supported by ball bearings 129, 130 on a jack shaft 131 having an end stud 132 threaded into the free end of link arm 135 which is oscillatory on the ring bearing 136 secured by the bolts 137 to boss 138 on the end of the frame of motor 117. The end of the shaft 131 opposite its threaded connection to the oscillatory link arm 135 is rotatably mounted on sleeve bearing 139 to link arm 140 which is oscillatory on the ring bearing 143 which is secured by the bolts 144 to bearing collar 109 in which the arbor 98 is free to rotate on the ball bearing 145.

Pulley 125 has a floating axis which is maintained by articulate link arms 135, 140 at a predetermined fixed distance from the respective shafts 98, 120. Accordingly, shaft 98 may be moved bodily with respect to armature shaft 120 without in any way interferring with transmission of torque from the motor 117 to the shaft 98.

The fluid motors 110 which are concurrently actuated to advance or retract the arbor 98 and the tools 97 thereon with respect to the workpieces on the slat conveyor 23 are supplied with air or other fluid through the lines 146, 147, as shown in FIGURE 17. Lines 146 supply fluid to the cylinder space beneath the pistons 148 and lines 147 supply fluid to the cylinder space above the pistons 148. The respective lines 146, 147 are selectively supplied with fluid from source 150 and vented through exhaust line 151 through the conventional valve 149. The position of the valve 149 is determined by armature 153 of a solenoid operator 154 which has dual magnetically opposed coils 155, 156.

The electric circuit for selectively energizing coils 155, 156 includes power line leads 157 supplying the primary winding of transformer 158 which has a secondary winding 159. One side of winding 159 is connected directly through line 160 to the common terminal 163 for both coils 155, 156. Terminal 164 of coil 155 and terminal 167 of coil 156 are connected through lines 165, 168, control switches 166, 169 and power switch 173 to the other side of secondary winding 159 of transformer 158. Switches 166, 169 are mechanically or otherwise interlocked as indicated at 171 so when one switch is thrown to closed position it will automatically open the other, and vice versa.

Accordingly, and assuming manual switch 173 to be closed, if switch 166 is closed and switch 169 is thereby open, coil 155 of the solenoid will be energized and the valve 149 will be thrown by armature 153 into one of its two positions, for example, the position shown in FIGURE 17, to supply fluid pressure to the undersides of pistons 148, thus to tend to raise the arbor 198. If switch 169 is closed and switch 166 thereby opened, coil 155 will be de-energized and coil 156 will be energized to reverse the armature 153 and reverse the position of the valve 149, thus to supply fluid pressure to the line 147 and lower the arbor 98.

The switches 166, 169 are desirably actuated in a timing sequence related to the position of the workpiece on the conveyor 23.

As best shown in FIGURES 13 through 16, slat conveyor shaft 28 extends into a timing box 174 mounted on the side rail 25 of the conveyor bed and houses the switches 166, 169 aforesaid. To the shaft 28 is secured by key 175 a sleeve rotor 176 which has gear 177 mounted to the end face thereof. The gear 177 meshes with radially aligned gear 178 which in turn meshes with gear 179, the respective gears 178, 179 being rotatable on jackshafts 180, 181 mounted in the opposite walls of housing 174. Each gear 178, 179 is free to rotate respecting corresponding hubs 184 as shown in FIGURE 16. Each hub is fixed by lock nut 185 to a graduated dial or disc 186 having peripheral markings. The gears 178, 179 carry clamping rings 182 selectively frictionally clamped to the dial 186 by set screws 187.

The hub 184 for each dial 186 carries a switch actuator button 188. The relative angular position of the button 188 with respect to its gear 178 is readily adjusted by loosening set screw 187 and turning its dial 186. The path of rotation of the respective buttons 188 intersects the roller actuators 189 of the switches 169, 166 so that the switches 166, 169 will be actuated in timed relation to the rotation of the striker buttons 188. By appropriate setting of the dials 186 the arbor 98 will be lowered and raised in desired timed relation to conveyor movement.

The graduations on the dials 186 are related to the length of cut, etc. which it is desired to make in the workpiece. One of the dials 186 is designated "up" and the other dial is designated "down." Accordingly, the points along the workpiece at which the fluid motors 110 will raise and lower the arbor 98 are readily determined. If the "down" switch is actuated shortly after the "up" switch, a short cut will be made. The angular displacement of the buttons 188 on their hubs 184 will determine the interval between actuation of the respective switches.

The individual fluid motors 76 of the embodiment of the invention shown in FIGURE 2 may be similarly individually controlled in timed relation with movement of workpiece on the conveyor 23 in the device of FIGURE 1. Each motor 76 can be incorporated in a circuit similar to that shown in FIGURE 17. Accordingly, for the purpose of this disclosure, the timing apparatus of FIGURES 13 through 16 are regarded as equally applicable to control the motors 110 concurrently as shown in FIGURE 8 or to control motors 76 individually in the embodiment of FIGURE 2 as applied to the structure shown in FIGURE 1.

I claim:

1. In a woodworking machine, the combination with a workpiece conveyor, of a plurality of woodworking tools, swing arms on which the tools are individually mounted, a motor, a drive shaft coupled to the motor, means respectively connecting said tools to said drive shaft in slidable relation to permit adjustment of the tools axially of the drive shaft, means individually pivotally mounting said arms coaxially with the drive shaft and including a cross way, individual tool arm carriages and means slidably mounting said carriages on said way, in further combination with a drive screw generally parallel to said crossway and means for threadably coupling said screw to said carriages, the means last mentioned being retractable whereby said carriages are selectively coupled to and released from said screw.

2. In a woodworking machine the combination with a workpiece conveyor, a drive shaft extending laterally over said workpiece conveyor, and a plurality of arms slidable along the axis of said drive shaft and swingable about the axis of said drive shaft, each said arm having a tool at the end thereof and means for transmitting power to said tool from said drive shaft, a crossway extending substantially parallel to said drive shaft, tool arm carriages adjustably mounted on said crossway, means mounting said arms for oscillation on said carriages and means for holding said arms in selected position with respect to said carriages, in combination with a common lead screw interconnecting said carriages for concurrent adjustment of said carriages along said way, and means for selectively disengaging said carriages from said lead screw.

3. In a woodworking machine the combination with a workpiece conveyor, a drive shaft extending laterally over said workpiece conveyor, and a plurality of arms slidable along the axis of said drive shaft and swingable about the axis of said drive shaft, each said arm having a tool at the end thereof and means for transmitting power to said tool from said drive shaft, a cross way extending substantially parallel to said drive shaft, tool arm carriages adjustably mounted on said crossway, means mounting said arms for oscillation on said carriages and means for holding said arms in selected position with respect to said carriages, each said holding means comprising a manually actuated interlock between an arm and carriage.

4. In a woodworking machine the combination with a workpiece conveyor, a drive shaft extending laterally over said workpiece conveyor, and a plurality of arms slidable along the axis of said drive shaft and swingable about the axis of said drive shaft, each said arm having a tool at the end thereof and means for transmitting power to said tool from said drive shaft, a cross way extending substantially parallel to said drive shaft, tool arm carriages adjustably mounted on said crossway, means mounting said arms for oscillation on said carriages and means for holding said arms in selected position with respect to said carriages, each said holding means comprising a fluid motor having displaceable members respectively connected to a carriage and its arm for selectivey positioning the arm with respect to the carriage depending upon the actuation thereof.

5. In a device of the character described incuding a workpiece conveyor and a workpiece cutting tool having operating means for advancing and retracting the tool with respect to said conveyor to cut into the workpiece when advanced with respect to the conveyor, an electric circuit including a control element and switches in circuit with said element, said control element comprising means for selectively actuating said operating means to advance or retract said tool, and means in driven connection with the conveyor for actuating said switches in timed coordination with the advance of said conveyor to control the time during which the tool is advanced, the means last mentioned further comprising a conveyor shaft, intermeshing gears coupled to the shaft, one of said gears being provided with an actuator for one of said switches and another of said gears being provided with an actuator for another of said switches, said actuators being rotatably adjustable with respect to said gears to adjust the time interval between actuation of said switches.

(References on following page)

References Cited in the file of this patent

UNITED STATES PATENTS

| | | |
|---|---|---|
| 319,395 | Doane | June 2, 1885 |
| 856,767 | Colvin et al. | June 11, 1907 |
| 1,096,611 | Dubrule | May 12, 1914 |
| 1,243,663 | Richardson | Oct. 16, 1917 |
| 1,413,201 | Tingleaf | Apr. 18, 1922 |
| 1,575,794 | Roark | Mar. 9, 1926 |
| 1,846,687 | Mentor | Feb. 23, 1932 |
| 1,894,415 | Onstad | Jan. 17, 1933 |
| 1,956,911 | Tate | May 1, 1934 |
| 1,977,971 | Payzant et al. | Oct. 23, 1934 |
| 2,302,878 | Muhl et al. | Nov. 24, 1942 |
| 2,332,654 | Mead et al. | Oct. 26, 1943 |
| 2,395,518 | Svenson | Feb. 26, 1946 |
| 2,501,299 | Anderson | Mar. 21, 1950 |
| 2,507,644 | Peters | May 16, 1950 |
| 2,641,288 | Blickenderfer et al. | June 9, 1953 |
| 2,714,407 | Pearson | Aug. 2, 1955 |
| 2,745,446 | Deiry et al. | May 15, 1956 |